United States Patent
Sakata et al.

(10) Patent No.: US 10,271,327 B2
(45) Date of Patent: Apr. 23, 2019

(54) WIRELESS COMMUNICATION DEVICE AND WIRELESS COMMUNICATION SYSTEM

(71) Applicant: KABUSHIKI KAISHA TOSHIBA, Minato-ku (JP)

(72) Inventors: Ren Sakata, Yokohama (JP); Hiroki Kudo, Kawasaki (JP); Fumiaki Kanayama, Kawasaki (JP); Yuji Tohzaka, Kawasaki (JP); Sakie Nagakubo, Kawasaki (JP); Suhwuk Kim, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 103 days.

(21) Appl. No.: 15/264,943

(22) Filed: Sep. 14, 2016

(65) Prior Publication Data
US 2017/0142710 A1 May 18, 2017

(30) Foreign Application Priority Data
Nov. 12, 2015 (JP) ................................. 2015-222274

(51) Int. Cl.
*H04W 72/04* (2009.01)

(52) U.S. Cl.
CPC .............................. *H04W 72/0446* (2013.01)

(58) Field of Classification Search
CPC ................................................ H04W 72/0446
See application file for complete search history.

(56) References Cited

U.S. PATENT DOCUMENTS

| 7,729,321 B2* | 6/2010 | Liu ................... H04W 74/0816 370/337 |
| 7,974,240 B2 | 7/2011 | Liu et al. |
| 2003/0017830 A1* | 1/2003 | Kayama ............ H04W 72/0446 455/450 |
| 2008/0111884 A1* | 5/2008 | Cloutier ................... H04Q 9/00 348/152 |

(Continued)

FOREIGN PATENT DOCUMENTS

| JP | 2008-22558 A | 1/2008 |
| JP | 2009-239778 A | 10/2009 |

(Continued)

*Primary Examiner* — Albert T Chou
(74) *Attorney, Agent, or Firm* — Oblon, McClelland, Maier & Neustadt, L.L.P.

(57) ABSTRACT

A wireless communication device according to an embodiment is one of a plurality of wireless communication devices in a multihop wireless communication system to transmit and receive information with each other. The wireless communication device has: a transmitter configured to transmit information in an m-th slot (m is an integer equal to or more than 1 and equal to or less than M, M is an integer equal to or more than 2) in a first slot group in N slot groups (N is an integer equal to or more than 2) in a frame, respective one of the slot groups including M slots, and a controller configured to control the transmitter to receive a connection request in an m-th slot in a second slot group in the N slot groups from a wireless communication device not included in the plurality of wireless communication devices.

10 Claims, 11 Drawing Sheets

(56) References Cited

U.S. PATENT DOCUMENTS

2010/0039933 A1* 2/2010 Taylor .................... H04L 67/12
                                                    370/217
2014/0323037 A1    10/2014 Murakami et al.
2016/0066319 A1     3/2016 Sakata et al.

FOREIGN PATENT DOCUMENTS

| JP | 2014-216796 A | 11/2014 |
| JP | 2016-54349 A | 4/2016 |
| WO | WO 2009/119867 A1 | 10/2009 |

* cited by examiner

WIRELESS COMMUNICATION DEVICE AND WIRELESS COMMUNICATION SYSTEM

CROSS REFERENCE TO RELATED APPLICATION

This application claims the benefit of priority from the prior Japanese Patent Application No. 2015-222274, filed on Nov. 12, 2015, the entire contents of which are incorporated by reference herein.

FIELD

Embodiments described herein relate to a wireless communication device and a wireless communication system.

BACKGROUND

Conventionally, a mesh network in which a plurality of wireless nodes are connected in a mesh shape has been utilized. As a communication scheme for this wireless mesh network, for example, a time division communication scheme is employed. In the time division communication scheme, since a timing at which each wireless node is put into a sleep state can be easily controlled, it is possible to realize power saving of the wireless mesh network.

However, in the wireless mesh network, there is a problem that, because information transmitted by each wireless node is transmitted to a root node while being relayed by a plurality of wireless nodes, it takes time for information to be transmitted to the root node.

DETAILED DESCRIPTION

A wireless communication device according to an embodiment is one of a plurality of wireless communication devices in a multihop wireless communication system to transmit and receive information with each other. The wireless communication device has: a transmitter configured to transmit information in an m-th slot (m is an integer equal to or more than 1 and equal to or less than M, M is an integer equal to or more than 2) in a first slot group in N slot groups (N is an integer equal to or more than 2) in a frame, respective one of the slot groups including M slots, and a controller configured to control the transmitter to receive a connection request in an m-th slot in a second slot group in the N slot groups from a wireless communication device not included in the plurality of wireless communication devices.

Embodiments of the present invention will be described below with reference to the drawings.

Figure 1:
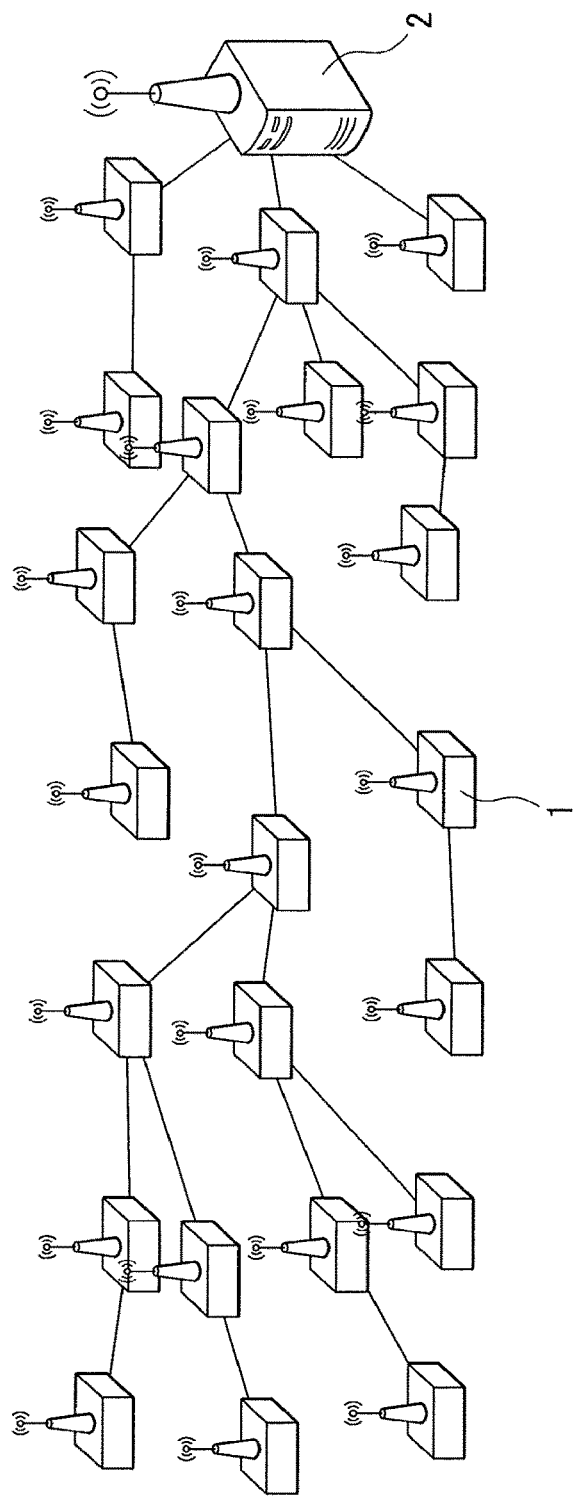
FIG. 1 is a diagram illustrating an example of a configuration of a wireless communication system.

First, outline of a wireless communication system will be described with reference to FIG. 1 and FIG. 2. FIG. 1 is a diagram illustrating an example of a configuration of the wireless communication system according to the present embodiment. As illustrated in FIG. 1, this wireless communication system includes a plurality of wireless communication devices 1 and an aggregation device 2. The wireless communication system is a multihop wireless communication system and it constitutes a wireless mesh network, and performs communication using a time division communication scheme.

In this wireless communication system, the plurality of wireless communication devices 1 and the aggregation device 2 located within a predetermined range can perform wireless communication with each other. The wireless communication device 1, on which an arbitrary sensor such as, for example, a temperature sensor and an acceleration sensor is mounted, wirelessly transmits sensor information measured by the sensor. In the following description, while a case will be described as an example where the wireless communication device 1 transmits the sensor information, information transmitted by the wireless communication device 1 is not limited to the sensor information.

The sensor information transmitted by each wireless communication device 1 is relayed by another wireless communication device 1 or directly transmitted to the aggregation device 2. The aggregation device 2 aggregates the sensor information transmitted from each wireless communication device 1. The aggregation device is, for example, a server provided with a wireless communication function.

Figure 2:
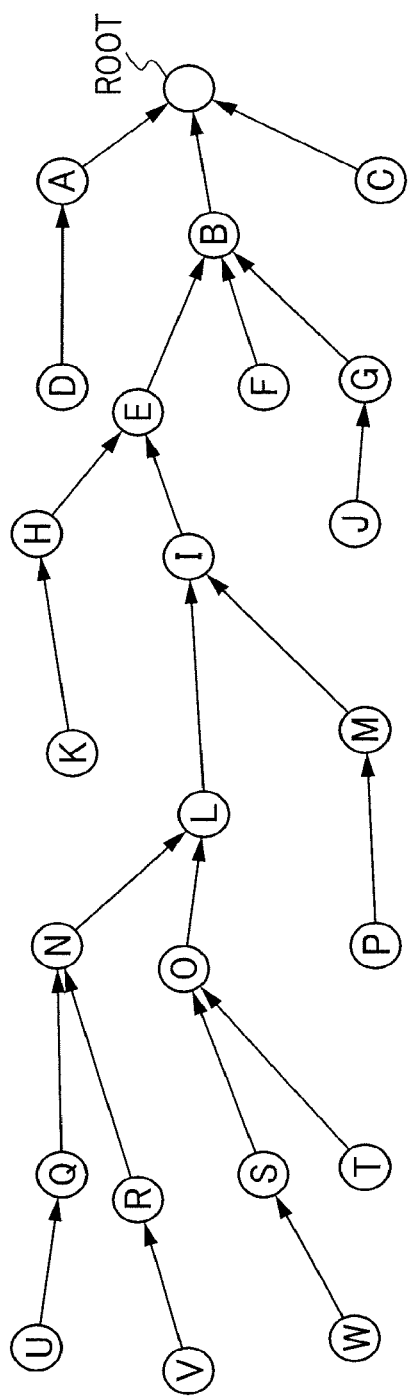
FIG. 2 is a diagram illustrating FIG. 1 in a form of a network topology.

FIG. 2 is a diagram schematically illustrating the wireless communication system in FIG. 1 in a form of a network topology. In FIG. 2, alphabetical characters indicate the wireless communication devices 1, a root indicates the aggregation device 2, arrows indicate communication channels of information. An origin of the arrow indicates a transmission source of the information, and a destination of the arrow indicates a transmission destination.

In the following description, the wireless communication devices 1 and the aggregation device 2 which constitute the wireless communication system are referred to as nodes, each wireless communication device 1 is referred to as a wireless node X, and the aggregation device 2 is referred to as a root node. X is an ID of each wireless node (hereinafter, referred to as a "node ID"), and corresponds to each alphabetical character in the drawing.

Further, the number of times sensor information of a certain wireless node X is transmitted or relayed until the sensor information reaches the root node will be referred to as the number of hops (hop counts). For example, the sensor information of the wireless node A in FIG. 2 reaches the root node if the wireless node A transmits the sensor information. Therefore, the number of hops of the wireless node A is one. Further, the sensor information of the wireless node E reaches the root node if the wireless node E transmits the sensor information and the wireless node B relays the sensor information. Therefore, the number of hops of the wireless node E is two. First group wireless communication devices are included in the plurality of wireless communication devices and the first group wireless communication devices have the same hop counts. For example, if the wireless nodes D, E, F and G are regarded as the first group wireless communication devices, the first group wireless communication devices have the same hop counts i.e., 2.

Further, among the plurality of wireless nodes X, nodes which are closer to the root node (whose number of hops to the root node is small) will be referred to as an upstream side, while nodes which are farther from the root node (whose number of hops to the root node is large) will be referred to as a downstream side.

Still further, among two wireless nodes which transmit/receive information, the wireless node at the upstream side or the root node will be referred to as a parent node, while a wireless node at the downstream side will be referred to as a child node. For example, the parent node of the wireless node B in FIG. 2 is the root node, and the child nodes thereof are wireless nodes E, F and G.

Next, a frame in the present embodiment will be described. In a time division communication scheme employed by the wireless communication system according to the present embodiment, an operation period corresponding to one cycle of the wireless communication system is set in advance. This operation period is referred to as a frame. The wireless communication system operates by repeating this frame.

Figure 3:
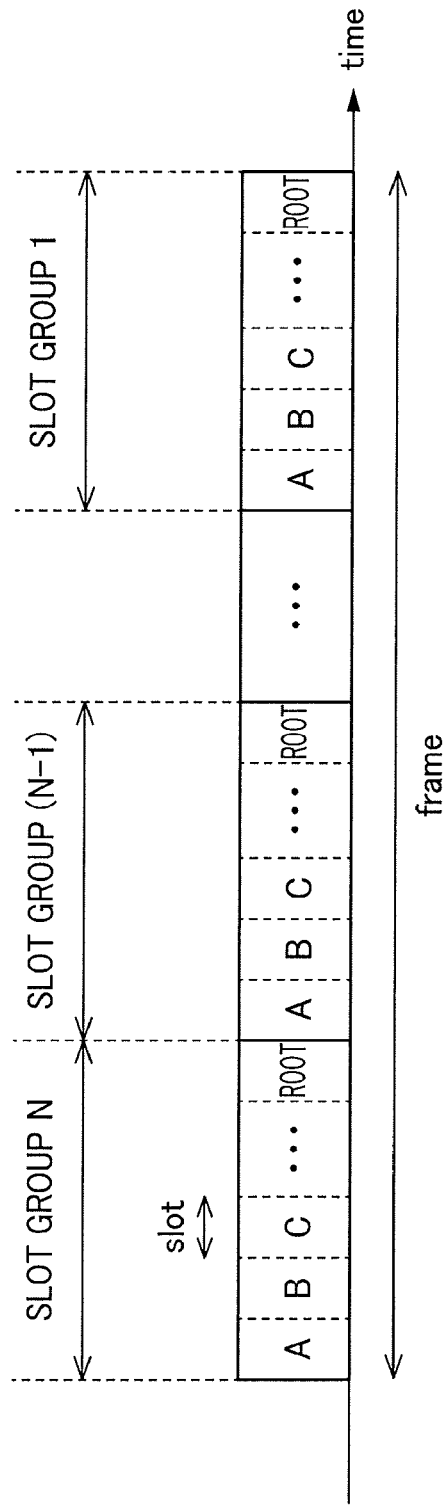
FIG. 3 is a diagram illustrating an example of a frame.

FIG. 3 is a diagram illustrating an example of the frame according to the present embodiment. As illustrated in FIG. 3, the frame is time-divided into a plurality of slots. The slot is unit time of operation of each node in the wireless communication system. When the frame is time-divided into 60 slots and a period of each slot is one minute, a period of one frame becomes one hour.

Further, a plurality of slot groups are set for the frame. The slot group is a period including a plurality of successive slots. The number of the slot groups is set at the maximum number of hops N in the wireless communication system or greater such that the slot groups do not overlap with each other. For example, respective one of the frame includes N slot groups and respective one of the slot groups includes M slots. M is an integer equal to or more than 2. N is an integer equal to or more than 2. In the example of FIG. 3, N slot groups are set for the frame.

For example, when the frame is time-divided into 300 slots and the maximum number of hops N is 10, 10 slot groups including successive 30 slots may be set or 15 slot groups including successive 20 slots may be set. The number of slots included in each slot group may be the same or different. Further, the frame may include a period during which a slot group is not set.

Further, each slot group is set such that slots more than nodes constituting the wireless communication system are included. For example, when the wireless communication system is constituted of nine wireless nodes and one root node, each slot group is set such that ten or more slots are included.

Still further, when it is expected that a new wireless node is connected to the wireless communication system, each slot group is set such that necessary slots are included in the slot group while the number of nodes to be newly connected is taken into account. For example, when a current wireless communication system is constituted of ten nodes, and it is expected that ten new wireless nodes are to be connected in the future, each slot group is set such that 20 or more slots are included therein.

Further, a rank value R is assigned to each slot group. The rank value R is a value indicating the number of hops of the wireless node. As described above, when the maximum number of hops in the wireless communication system is N, 1 to N rank values R are respectively assigned to the slot groups.

At this time, the greater rank values R are assigned to earlier slot groups in the frame, while the smaller rank values R are assigned to later slot groups. For example, a rank value N is assigned to the first slot group in the frame of FIG. 3, and a rank value 1 is assigned to the last slot group. Hereinafter, a slot group to which the rank value R is assigned is referred to as a slot group R. For example, the number of hops is the same value as the rank value R.

Further, a node ID of each node constituting the wireless communication system is assigned to each slot included in each slot group. In the example of FIG. 3, node IDs of wireless nodes A, B, C, . . . , and the root node are sequentially assigned to respective slots in each slot group from earlier slots. It should be noted that the order in which the node IDs are assigned to the slots is not limited to the example of FIG. 3 and is arbitrary. Each slot group may include slots to which the node IDs are not assigned. Further, the order of the assignment of the node IDs may be different for each slot group. Hereinafter, a slot to which a node ID of a wireless node X is assigned will be referred to as a slot X.

Further, when it is expected that a new wireless node is to be connected to the wireless communication system, each slot group may include a slot to which a node ID of an unconnected wireless node is assigned. When a node ID of an unconnected wireless node is known in advance, the node ID of the unconnected wireless node can be assigned by the node ID being assigned to the slot.

On the other hand, when the node ID of the unconnected wireless node is unknown, it is only necessary to assign the number according to the order of the wireless node being connected to the wireless communication system to each slot in advance, and associate the assigned number with the node ID of the wireless node in the order of the wireless node being connected. For example, when three wireless nodes are connected to the wireless communication system and the fourth new wireless node X is connected thereto, X is associated with the number 4 of the slot. By this means, a node ID of the new wireless node X is assigned to the slot to which the number 4 is assigned.

As described above, in the present embodiment, a plurality of slot groups are set in advance to the frame. Then, rank values are respectively assigned to the slot groups. Node IDs of wireless nodes are assigned to slots included in each of the slot groups. In the following description, a slot to which the wireless node is assigned corresponds to a slot to which a node ID of the wireless node is assigned.

The above-described setting information is stored in each of the nodes as frame information. Each node executes transmission processing, reception processing and connection processing by utilizing the frame information. The transmission processing, the reception processing and the connection processing of each wireless node will be respectively described below.

First, the transmission processing of each wireless node will be described. Each wireless node has a rank value R indicating the number of hops of the own node, and determines and uses a transmission slot of the own node based on the rank value R. The transmission slot is a slot through which the wireless node transmits information. The wireless node executes transmission of sensor information of the own node and relay of sensor information received from a child node using the transmission slot.

Specifically, each wireless node X uses a slot X to which the own node is assigned in a slot group R to which the rank value R of the own node is assigned as a transmission slot. That is, the transmission slot of the wireless node X having the rank value R becomes a slot X of the slot group R.

Figure 4:
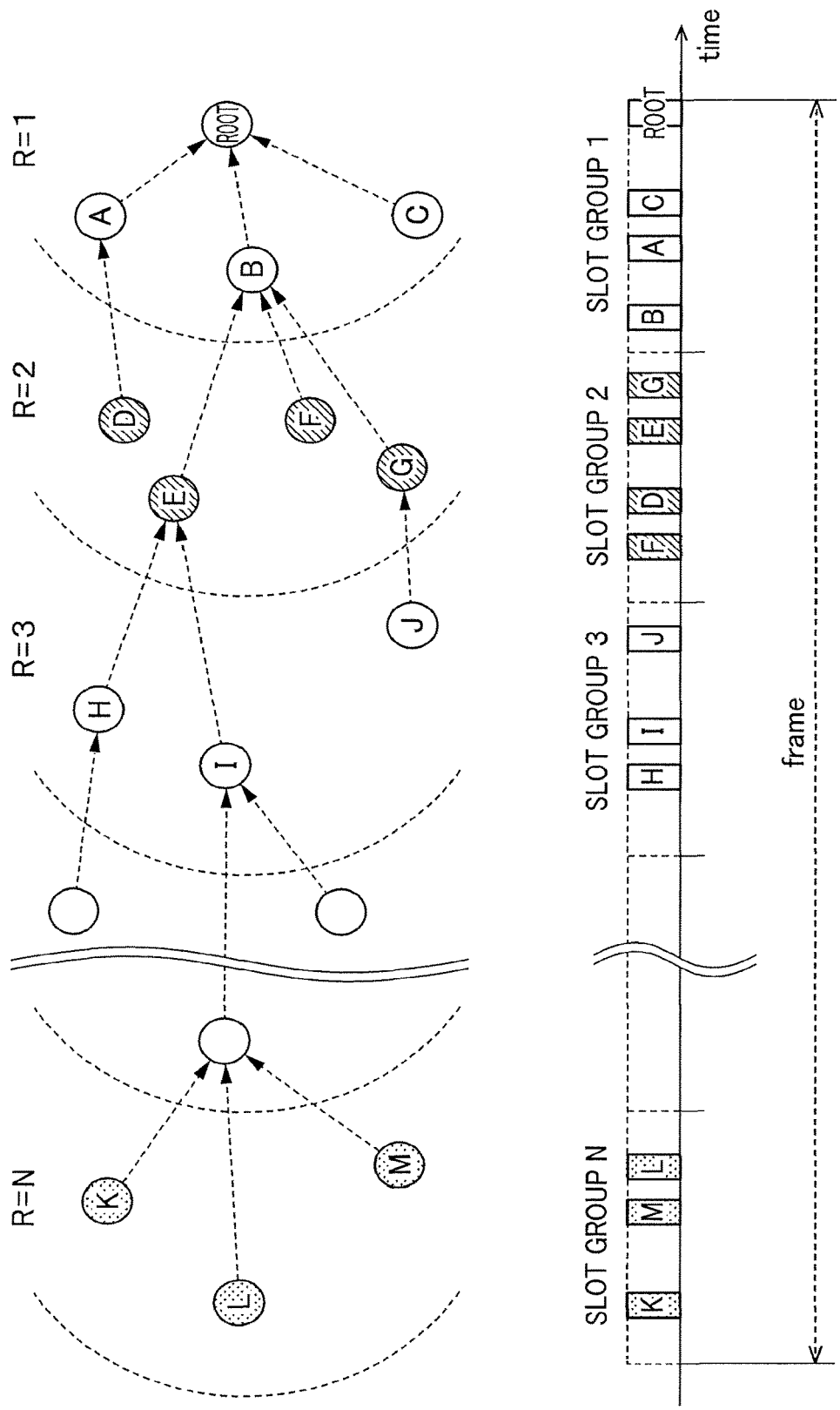
FIG. 4 is a diagram illustrating an example of a transmission slot.

FIG. 4 is a diagram illustrating an example of the transmission slot determined in this manner. For example, in the example of FIG. 4, because the number of hops of the wireless node A is one, the rank value is 1 (R=1). This wireless node A uses a slot A (a slot to which the wireless node A is assigned) of a slot group 1 as the transmission slot.

In the present embodiment, each wireless node determines the transmission slot as described above. As a result, earlier slots in the frame are assigned as the transmission slots to wireless nodes located at downstream side (having the larger number of hops) in a communication channel of the sensor information.

For example, when attention is focused on a wireless node I in FIG. 4, an information communication channel from the wireless node I to the root node is constituted of wireless nodes I, E and B and the root node from the downstream side. Further, as can be seen from FIG. 4, transmission slots of these wireless nodes are earlier in order of the wireless nodes I, E and B and the root node.

By a transmission slot of each wireless node being assigned in this manner, it is possible to shorten an information communication period from each wireless node to the root node. Specifically, it is possible to make the information communication period within one frame.

Further, because different slots are assigned to transmission slots of the wireless nodes, it is possible to avoid collision of transmission signals.

Next, the reception processing of each wireless node will be described. Each wireless node determines and uses a first reception period and a second reception period during which reception processing is executed based on the rank value R of the own node.

The first reception period is a period during which the wireless node receives a wireless signal from a child node. The wireless node relays the sensor information included in the wireless signal received from the child node during the first reception period, to a parent node during the transmission slot of the own node. The wireless node determines the first reception period so as to include the transmission slot of the child node.

A rank value of a child node Y of a certain wireless node X becomes greater than the rank value of the wireless node X by one. That is, when the rank value of the wireless node X is R, the rank value of the child node Y is (R+1). Therefore, the transmission slot of the child node Y becomes a slot Y of the slot group (R+1). The wireless node X determines a period including the slot Y of the slot group (R+1) as the first reception period.

For example, the wireless node X may determine the slot group (R+1) as the first reception period. This corresponds to a case where the wireless node E in FIG. 4 determines the slot group 3 as the first reception period. By determining the first reception period in this manner, the wireless node X can receive a wireless signal from the child node Y even when the wireless node X cannot recognize the node ID of the child node Y.

Further, the wireless node X may determine the slot Y of the slot group (R+1) as the first reception period. This corresponds to a case where the wireless node E in FIG. 4 determines slots H and I of the slot group 3 as the first reception period. By determining the first reception period in this manner, the wireless node X can shorten a period during which the reception processing is executed and can reduce power consumption.

The second reception period is a period during which the wireless node receives a wireless signal from a parent node. The wireless node determines whether or not a current parent node is appropriate or selects a new parent node based on the wireless signal received during the second reception period. The wireless node determines the second reception period so as to include a transmission slot of the parent node.

A rank value of a parent node Z of a certain wireless node X is smaller than the rank value of the wireless node X by one. That is, when the rank value of the wireless node X is R, the rank value of the parent node Z is (R−1). Therefore, the transmission slot of the parent node Z becomes a slot Z of the slot group (R−1). The wireless node X determines a period including the slot Z of the slot group (R−1) as the second reception period.

For example, the wireless node X may determine the slot group (R−1) as the second reception period. This corresponds to a case where the wireless node E in FIG. 4 determines the slot group 1 as the second reception period. By determining the second reception period in this manner, the wireless node X can receive a wireless signal from the parent node Z and can determine whether or not the parent node Z is appropriate. Further, the wireless node X can receive a wireless signal from each wireless node having the rank value (R−1) and can select a new parent node based on the received wireless signal.

Further, the wireless node X may determine the slot Z of the slot group (R−1) as the second reception period. This corresponds to a case where the wireless node E in FIG. 4 determines the slot B of the slot group 1 as the second reception period. By determining the second reception period in this manner, the wireless node X can shorten a period during which the reception processing is executed and can reduce power consumption.

Figure 5:
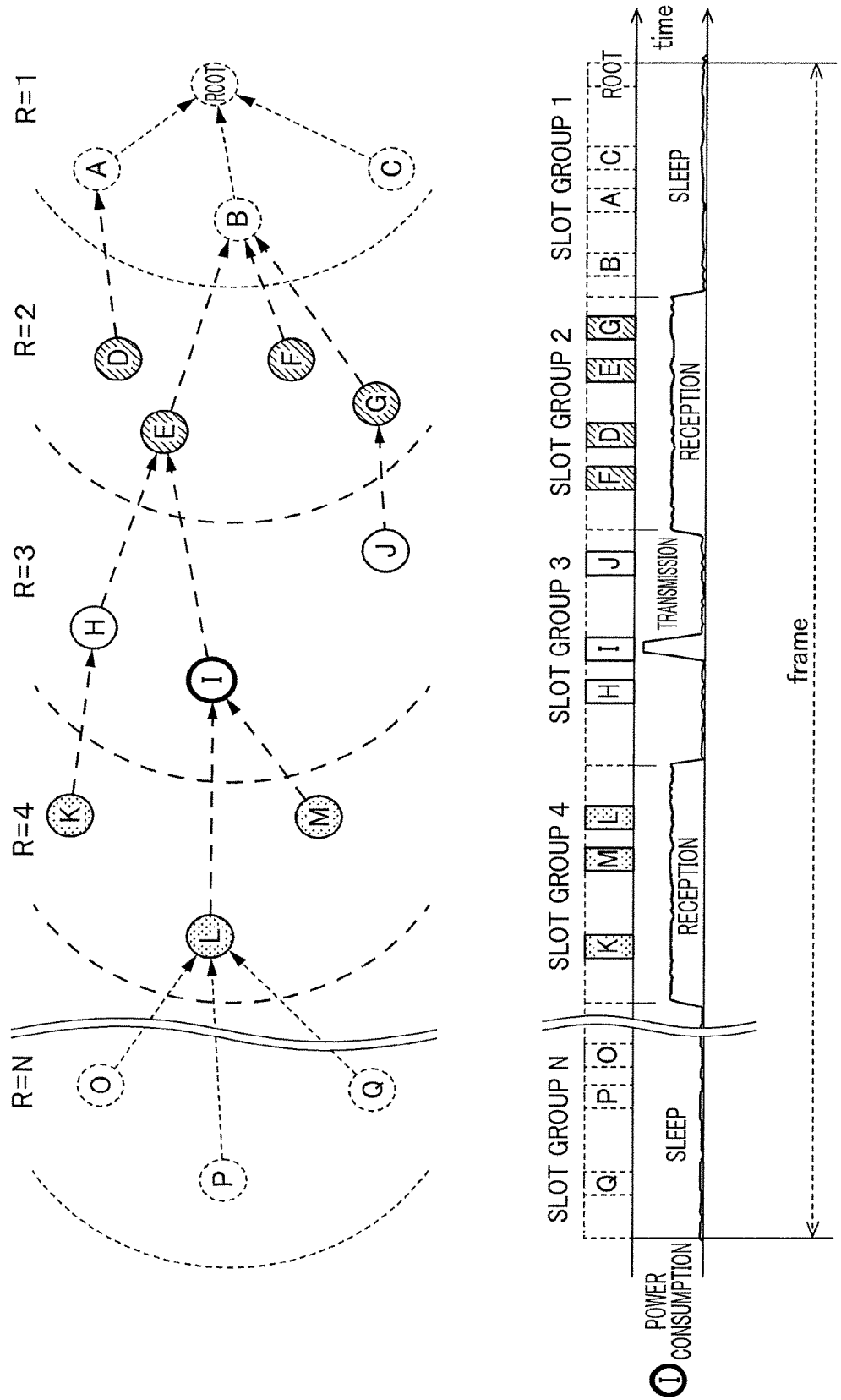
FIG. 5 is a diagram illustrating an example of a transmission slot, a first reception period and a second reception period.
Figure 6:
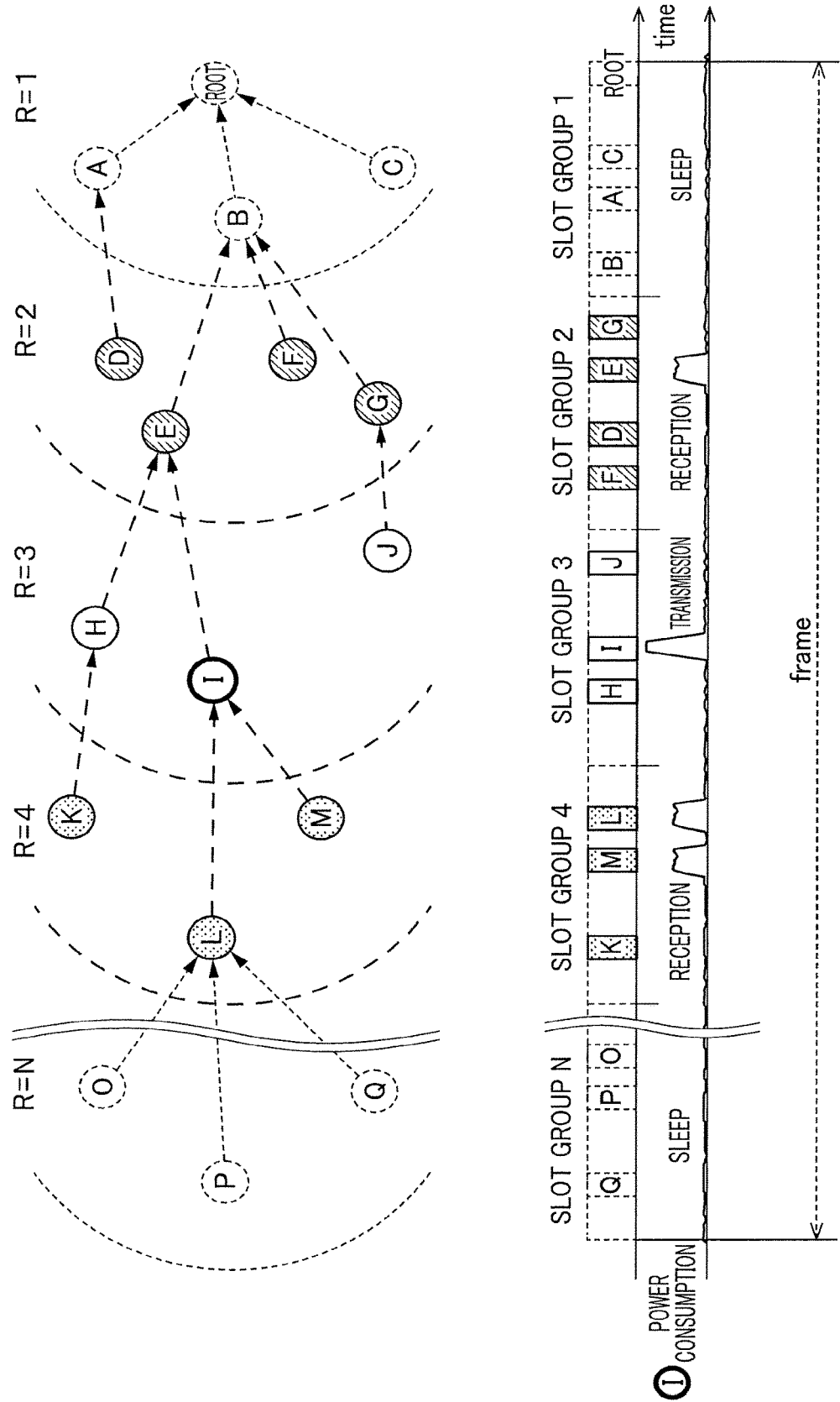
FIG. 6 is a diagram illustrating another example of the transmission slot, the first reception period and the second reception period.

FIG. 5 and FIG. 6 are diagrams illustrating examples of the transmission slot, the first reception period and the second reception period. In the example of FIG. 5, the transmission slot of the wireless node I (R=3) is a slot I of the slot group 3, the first reception period is a slot group 4, and the second reception period is a slot group 2. In the example of FIG. 6, the transmission slot of the wireless node I (R=3) is a slot I of the slot group 3, the first reception period is slots L and M of the slot group 4, and the second reception period is a slot E of the slot group 2. In FIG. 5 and FIG. 6, during a period except the transmission slot, the first reception period and the second reception period, the wireless node I is put into a sleep state in which the wireless node I cannot transmit/receive a signal. By being put into a sleep state, the wireless node I can reduce power consumption. The sleep state will be described in detail later.

Next, the connection processing of each wireless node will be described. The connection processing is processing for connecting a wireless node not connected to the wireless communication system (hereinafter, referred to as a "new wireless node") to the wireless communication system. The connection processing includes connection request processing and connection accepting processing.

The connection request processing is processing in which a new wireless node transmits a connection request to a candidate node which is connected. The candidate node is a node which becomes a candidate for the parent node of the new wireless node. The connection request is a signal transmitted by the new wireless node to request the candidate node to connect the own node as a child node. The connection request includes a node ID of the new wireless node and a node ID of the candidate node.

The new wireless node receives a wireless signal during a candidate node search period and determines a candidate node based on the received wireless signal. The candidate node search period is, for example, one frame. The new wireless node then transmits a connection request to the determined candidate node during a connection request period. The connection request period is part or all of a connection accepting period of the candidate node. The connection accepting period will be described in detail later.

The connection accepting processing is processing in which the candidate node receives a connection request from the new wireless node, determines whether or not connection is possible from the new wireless node, and returns the determination result to the new wireless node. The candidate node determines whether or not connection is possible based on the number of child nodes which have already been connected and the size of current payload.

When the candidate node approves connection, the new wireless node is connected to the wireless communication system as the child node of the candidate node. That is, the candidate node becomes a parent node of the new wireless node.

Each wireless node which has been connected determines a connection accepting period for executing the above-described connection accepting processing. The connection accepting period is a period during which the wireless node accepts (performs reception processing of) a connection request addressed to the own node. The connection accepting period of each wireless node preferably meets the following conditions.

The first conditions are that the connection accepting period does not overlap with the transmission slot of the own node. If the connection accepting period overlaps with the transmission slot of the own node, the transmission processing and the connection accepting processing have to be executed during the transmission slot, which may make the processing complicated, and which may make it impossible to perform processing in time. Further, there is a risk that a signal transmitted by the own node may collide with a connection request addressed to the own node, which may make it impossible to receive the connection request.

The second conditions are that the connection accepting period does not overlap with transmission slots of other nodes. If the connection accepting period overlaps with the transmission slots of other nodes, there is a risk that signals transmitted by other nodes may collide with a connection request, which may make it impossible to receive the connection request.

The third conditions are that the connection accepting period does not overlap with connection accepting periods of other nodes. If the connection accepting period of the own node overlaps with connection accepting periods of other nodes, there is a risk that a connection request addressed to the own node may collide with connection requests addressed to other nodes, which may make it impossible to receive the connection request.

A connection accepting period of the wireless node X which meets the first to the third conditions can include a slot X to which the wireless node X is assigned in the slot group to which a rank value different from the wireless node X is assigned.

Figure 7:
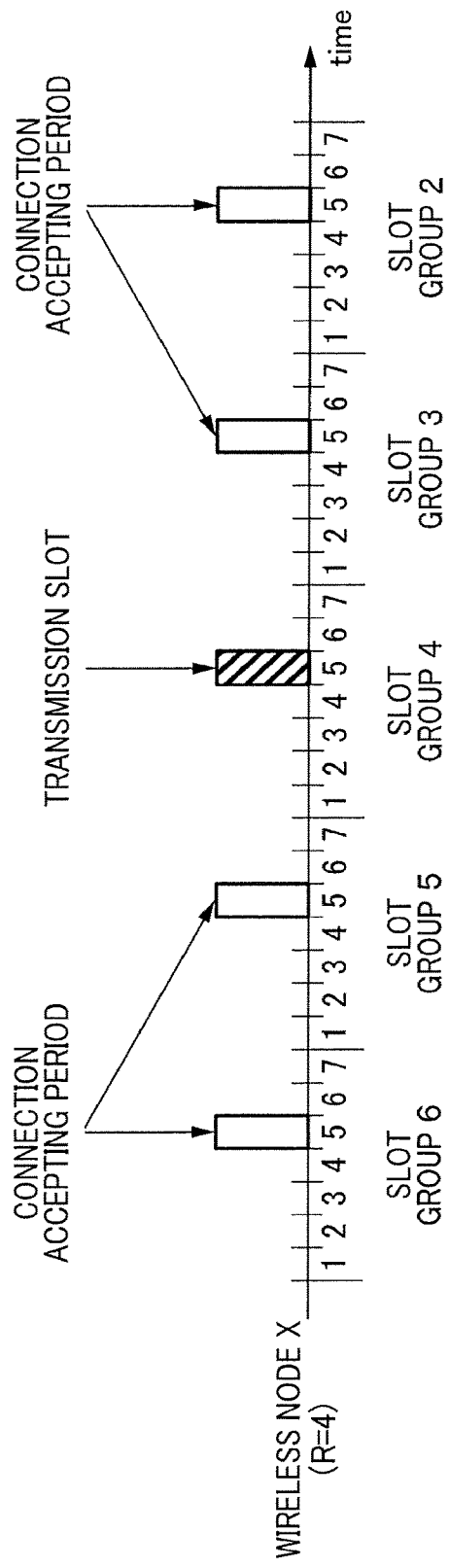
FIG. 7 is a diagram illustrating an example of a connection accepting period.

FIG. 7 is a diagram illustrating an example of such a connection accepting period. FIG. 7 illustrates a connection accepting period of the wireless node X having the rank value 4. In the example of FIG. 7, a slot 5 is assigned to the wireless node X.

As illustrated in FIG. 7, the transmission slot of the wireless node X is a slot 5 of a slot group 4. On the other hand, the connection accepting period of the wireless node X is a slot 5 in slot groups other than the slot group 4.

The slot 5 of the slot groups other than the slot group 4 is neither used as a transmission slot by the wireless node X and other wireless nodes nor used as the connection accepting period of other wireless nodes. Therefore, the slot 5 of the slot groups other than slot group 4 meets all the first to the third conditions.

Based on the rank value R of the own node, the wireless node X can determine one or a plurality of slots X to which the own node is assigned in the slot groups to which rank values other than the rank value R are assigned, as the connection accepting period.

On the other hand, a slot group for connection acceptance may be provided at the head of the frame in advance. In this case, each wireless node can determine a slot of the own node in the slot group for connection acceptance as the connection accepting period. The connection accepting period of each wireless node determined in this manner meets all the above-described first to third conditions.

By setting the slot group for connection acceptance, because the connection accepting processing can be performed at the same time as other processing performed at the head of the frame, it is possible to make the whole processing efficient. Further, because the connection accepting periods of all the connected wireless nodes become the same slot group, it is not necessary to change a slot group in which a new wireless node transmits a connection request. By this means, it is possible to simplify the connection request processing.

As described above, by determining the connection accepting period of each wireless node so as to meet the first to the third conditions, it is possible to suppress collision of the connection request with other wireless signals, so that it is possible to improve reception accuracy of the connection request.

Further, it is possible to set the slot X of the slot group to which a rank value greater than the rank value R of the own node by two or greater is assigned as the connection accepting period of the wireless node X having the rank value R, for the following reasons.

The sensor information of the new wireless node which requests connection to the wireless node X can be relayed as soon as possible by the wireless node X. However, when the connection accepting period of the wireless node X is a slot X of the slot group to which a rank value equal to or less than (R−1) is assigned, even when a new wireless node is connected during this connection accepting period, the sensor information of the new wireless node is received by the wireless node X in a transmission slot of the new wireless node in the next frame.

For example, when the connection accepting period of the wireless node X in FIG. 7 is a slot 5 of the slot group 3, the sensor information of the new wireless node connected to the slot 5 of the slot group 3 of a certain frame is received by the wireless node X in the slot group 5 in the next frame.

The same applies to a case where the connection accepting period of the wireless node X is a slot X of the slot group (R+1) to which the rank value (R+1) is assigned, because a slot earlier than the slot X can be assigned to the new wireless node.

For example, when the connection accepting period of the wireless node X in FIG. 7 is a slot 5 of the slot group 5, when a new wireless node to which the slot 1 is assigned is connected to the slot 5 of the slot group 5 of a certain frame, sensor information of the new connected wireless node is received by the wireless node X in the slot 1 of the slot group 5 of the next frame.

As a result, when the connection accepting period of the wireless node X having the rank value R is a slot X of the slot group to which a rank value equal to or less than (R+1) is assigned, sensor information of the new wireless node can be relayed in the next frame of the frame in which the new wireless node is connected to the wireless communication system.

On the other hand, when the connection accepting period of the wireless node X is a slot X of the slot group to which a rank value equal to or greater than (R+2) is assigned, when a new wireless node is connected during this connection accepting period, sensor information of the new wireless node is received by the wireless node X in the same frame as the frame in which the new wireless node is connected.

For example, when the connection accepting period of the wireless node X in FIG. 7 is a slot 5 of the slot group 6, sensor information of the new wireless node connected to the slot 5 of the slot group 6 in a certain frame is received by the wireless node X in the slot group 5 of the frame.

As a result, when the connection accepting period of the wireless node X having the rank value R is a slot X of the slot group to which a rank value equal to or greater than (R+2) is assigned, the sensor information of the new wireless node is relayed in the same frame as the frame in which the new wireless node is connected to the wireless communication system.

In this manner, by setting the slot X of the slot group to which a rank value greater than the rank value R of the own node by two or greater is assigned as the connection accepting period of the wireless node X having the rank value R, it is possible to start relay of the sensor information of the new wireless node quickly. Specifically, it is possible to start relay of the sensor information of the new wireless node in the same frame as the frame in which the new wireless node is connected.

It should be noted that when there are a plurality of connection accepting periods of the wireless nodes, the new wireless node may execute reception processing before transmitting a connection request to the candidate node, to confirm whether other wireless nodes do not transmit connection requests to the same candidate node. When other wireless nodes do not transmit connection requests, the new wireless node transmits a connection request of the own node. Further, when other wireless nodes transmit connection requests, the new wireless node executes connection request processing again in the next connection accepting period.

By this means, it is possible to suppress collision of a plurality of connection requests to the same candidate node, so that it is possible to improve reception accuracy of the connection request.

Figure 8:
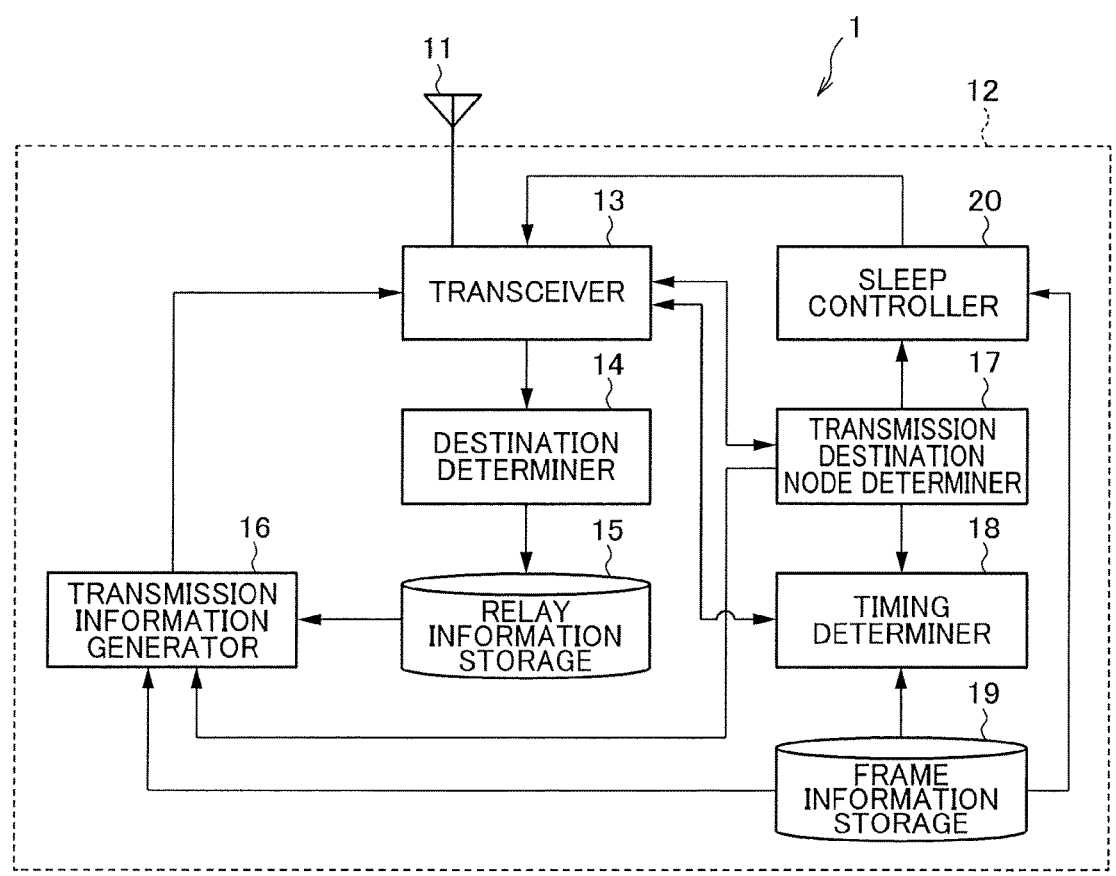
FIG. 8 is a diagram illustrating an example of a configuration of a wireless communication device.

Next, a configuration of the wireless communication device 1 according to the present embodiment will be described with reference to FIG. 8. The wireless communication device 1 according to the present embodiment autonomously configures the above-described wireless communication system. FIG. 8 is a diagram illustrating an example of the configuration of the wireless communication device 1. The wireless communication device 1 in FIG. 8 includes a transmission/reception antenna (transmitter/receiver) 11 and a wireless communication unit (a controller) 12.

The transmission/reception antenna 11 receives a wireless signal. The wireless signal received by the transmission/reception antenna 11 is a wireless signal transmitted by another node which is close to the own node. Therefore, the transmission/reception antenna 11 can receive wireless signals from a plurality of other nodes. The transmission/reception antenna 11 converts the received wireless signal into an electrical signal and inputs the electrical signal to the wireless communication unit 12.

Further, the transmission/reception antenna 11 converts the electrical signal output from the wireless communication unit 12 into a wireless signal and transmits the wireless signal.

The wireless communication unit 12 configured to control the transmission/reception antenna 11. The wireless communication unit 12 is constituted of a baseband circuit and an RF circuit, as will be described later. FIG. 8 illustrates a functional configuration of the wireless communication unit 12. As illustrated in FIG. 8, the wireless communication unit 12 includes a transceiver 13, a destination determiner 14, a relay information storage 15, a transmission information generator 16, a transmission destination node determiner 17, a timing determiner 18 and a frame information storage 19.

The transceiver 13 executes reception processing of wireless signals. Specifically, the transceiver 13 performs predetermined signal processing on the electrical signal input from the transmission/reception antenna11 to acquire reception information from the received wireless signal. The signal processing includes processing such as AD conversion and decoding according to predetermined communication protocol.

The reception information includes a rank value of a transmission source node, sensor information of the transmission source node, a node ID of the transmission source node, relay information of the transmission source node and a node ID of a transmission destination node.

The transmission source node is a node which transmits the reception information received by the transceiver 13. The transmission destination node is a node which is designated by the transmission source node as a destination of the information. The node ID is a unique identifier of each node. The relay information is sensor information of another node, which is relayed by the transmission source node.

Further, the transceiver 13 executes transmission processing of wireless signals. Specifically, the transceiver 13 performs predetermined signal processing on transmission information generated by the transmission information generator 16 to convert the transmission information into an electrical signal, and outputs the electrical signal to the transmission/reception antenna 11. The signal processing includes processing such as DA conversion and encoding according to predetermined communication protocol.

The transmission information includes a rank value of the own node, sensor information of the own node, a node ID of the own node, relay information of the own node and a node ID of a transmission destination node.

A timing at which the transceiver 13 executes reception processing and transmission processing of a wireless signal is determined by the timing determiner 18.

The destination determiner 14 acquires the reception information from the transceiver 13 and determines whether the destination of the reception information is the own node.

The destination determiner 14 determines that the destination of the reception information is the own node when the node ID of the transmission destination node included in the reception information is the node ID of the own node.

The relay information storage 15 temporarily stores the reception information for which it is determined by the destination determiner 14 that the destination is the own node as relay information.

The transmission information generator 16 generates transmission information and a connection request. The transmission information generator 16 generates the transmission information by, for example, adding the rank value of the own node, the sensor information of the own node, the node ID of the own node and the node ID of the transmission destination node to the relay information stored in the relay information storage 15.

Further, the transmission information generator 16 generates a connection request including the rank value of the own node, the node ID of the own node and the node ID of the transmission destination node.

The rank value of the own node and the node ID of the transmission destination node can be acquired from the transmission destination node determiner 17. Further, the node ID of the own node can be acquired from the frame information storage 19. The transmission information generated by the transmission information generator 16 is input to the transceiver 13.

The transmission destination node determiner 17 acquires the reception information from the transceiver 13 and determines a transmission destination node, which becomes a destination of the transmission information, based on the acquired reception information. When the own node is connected, the transmission destination node determiner 17 determines the transmission destination node (parent node) based on the reception information received during the second reception period. The transmission destination node determiner 17, for example, determines a wireless node for which a wireless signal has the largest signal strength among nodes whose rank values are smaller than the rank value of the own node by one or greater as the transmission destination node (parent node).

Further, when the own node is unconnected, the transmission destination node determiner 17 causes the transceiver 13 to execute reception processing during a candidate node search period. The transmission destination node determiner 17 then determines the transmission destination node (candidate node) based on the reception information received during the candidate node search period. The transmission destination node determiner 17, for example, determines a wireless node for which a wireless signal has the largest signal strength as the transmission destination node (candidate node).

Further, the transmission destination node determiner 17 determines the rank value of the own node based on the determined transmission destination node. Specifically, the transmission destination node determiner 17 determines a rank value greater than the rank value of the determined transmission destination node by one as the rank value of the own node.

The timing determiner 18 determines timings for transmission processing, reception processing, connection accepting processing, connection request processing, or the like, of the own node based on the rank value of the own node and the frame information. Specifically, the timing determiner 18 determines a transmission slot, a first reception period, a second reception period, a connection accepting period and a connection request period. The frame information is setting information of a frame, a slot group, a slot, or the like, in the wireless communication system as described above.

The timing determiner 18 first selects a slot group which includes the transmission slot based on the rank value R of the own node determined by the transmission destination node determiner 17, and the frame information. Next, the timing determiner 18 determines a slot to which the node ID of the own node is assigned among slots included in the selected slot group as the transmission slot.

By this means, the transmission slot of the wireless node X of the rank value R is determined by the slot X of the slot group R. By each wireless communication device 1 determining the transmission slot in this manner, the above-described slot assignment method is realized.

The timing determiner 18 may perform synchronization processing before determining the transmission slot. The synchronization processing is processing for synchronizing time counted at the own node with time at other nodes.

The timing determiner 18, for example, acquires transmission time (transmission slot) of the transmission source node based on the rank value and the node ID of the transmission source node included in the reception information, and the frame information. The timing determiner 18 can perform synchronization processing by comparing time obtained by adding a signal processing period by the transceiver 13 of the own node to this transmission time with the time counted at the own node. It should be noted that the timing determiner 18 may perform synchronization processing while taking into account time required for propagation of the wireless node from the transmission source node.

Further, the timing determiner 18 determines the first reception period based on the rank value R of the own node determined by the transmission destination node determiner 17, and the frame information. The first reception period may be a slot group (R+1) to which a rank value (R+1) greater than the rank value R of the own node by one is assigned, or a slot Y to which a child node Y in the slot group (R+1) is assigned.

Further, the timing determiner 18 determines the second reception period based on the rank value R of the own node determined by the transmission destination node determiner 17 and the frame information. The second reception period may be a slot group (R−1) to which a rank value (R−1) smaller than the rank value R of the own node by one is assigned, or a slot Z to which a parent node Z in the slot group (R−1) is assigned.

Further, the timing determiner 18 determines the connection accepting period based on the rank value R of the own node determined by the transmission destination node determiner 17, and the frame information. The timing determiner 18 determines a slot X to which the own node is assigned in one or a plurality of slot groups to which rank values different from the rank value R of the own node are assigned, as the connection accepting period. The timing determiner 18 preferably determines a slot X to which the own node is assigned in one or a plurality of slot groups to which rank values greater than the rank value R of the own node by two or greater are assigned, as the connection accepting period.

Further, when the own node is unconnected, the timing determiner 18 determines the connection request period based on the node ID and the rank value of the transmission destination node determined by the transmission destination node determiner 17 and the frame information. The timing determiner 18 acquires the connection accepting period of the transmission destination node based on the node ID and the rank value of the transmission destination node and determines the connection request period based on the connection accepting period of the transmission destination node. The timing determiner 18 may determine all the connection accepting periods of the transmission destination node as the connection request period or may determine part of the connection accepting periods of the transmission destination node as the connection request period.

The frame information storage 19 stores the frame information. The frame information may be registered in advance or may be registered and updated through wireless communication. The frame information includes information such as a frame length and start time, rank values assigned to respective slot groups and node IDs (or numbers) assigned to respective slots. Further, in the frame information storage 19, information of the own node (such as a node ID) is stored.

A sleep controller 20 controls an operation state of the own node to be a wake-up state or a sleep state. The wake-up state is a state in which the wireless communication device 1 can transmit/receive information. In the wake-up state, the transceiver 13 operates.

Meanwhile, the sleep state is a state in which the wireless communication device 1 cannot transmit/receive information. In the sleep state, the operation of the transceiver 13 pauses. Further, in the sleep state, part of arithmetic processing except counting of time, the sleep controller 20, or the like, also pauses. Therefore, in the sleep state, power is less consumed than in the wake-up state in the wireless communication device 1.

The sleep controller 20 puts the own node into the wake-up state during a period in which the own node transmits information (transmission slot), the connection request period, a period in which information is received (the first reception period and the second reception period) and the connection accepting period, and puts the own node into the sleep state in other periods. In the following description, transitioning from the wake-up state to the sleep state of the wireless communication unit 12 will be referred to as "sleep", while transitioning from the sleep state to the wake-up state will be referred to as "wake up".

Figure 9:
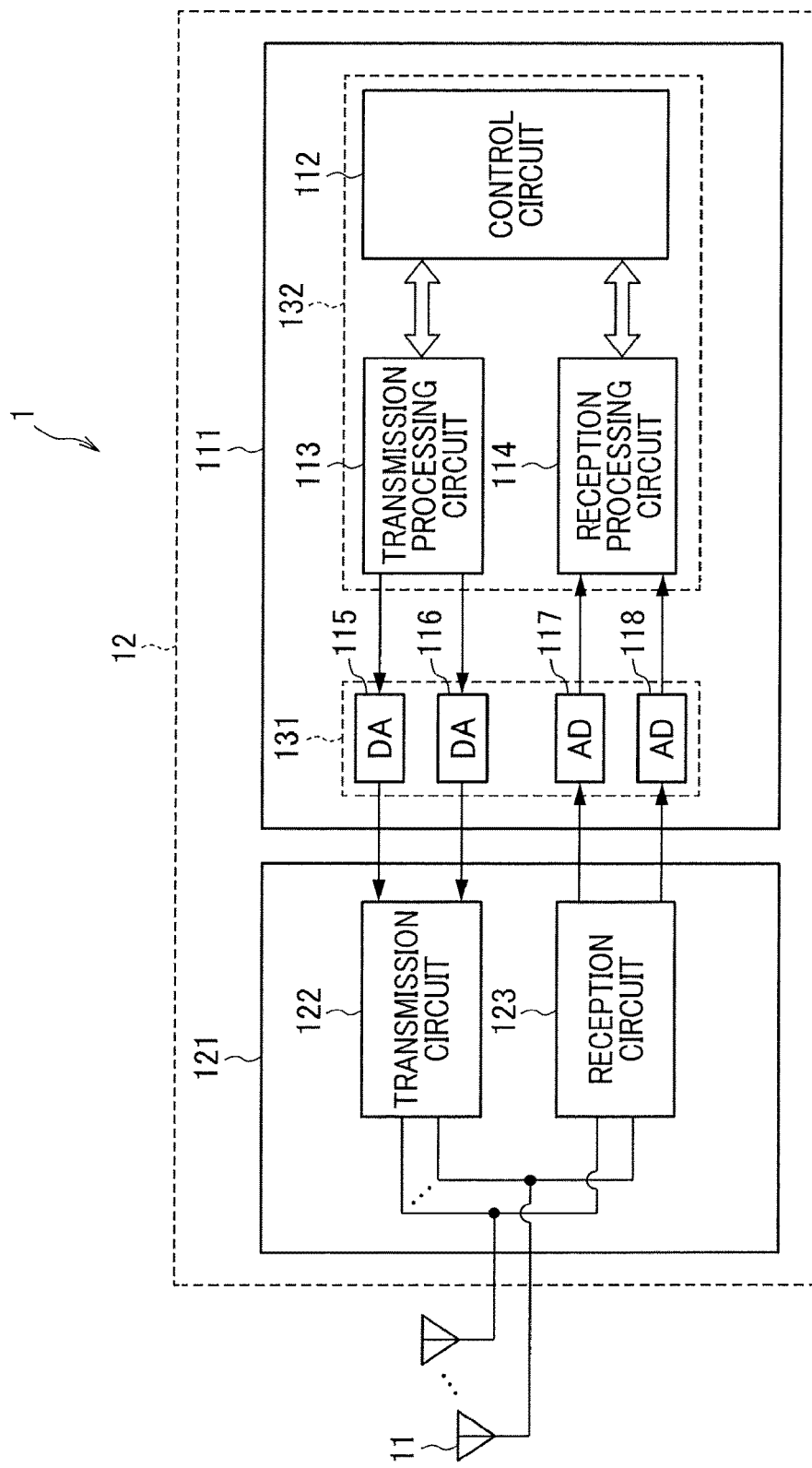
FIG. 9 is a diagram illustrating an example of a hardware configuration of the wireless communication device.

A hardware configuration of the wireless communication device 1 will be described next with reference to FIG. 9. FIG. 9 is a diagram illustrating an example of the hardware configuration of the wireless communication device 1 according to the present embodiment. The wireless communication device 1 in FIG. 9 includes an antenna 11, a baseband circuit 111 and an RF circuit 121.

Functions of the wireless communication unit 12 are realized with the baseband circuit 111 and the RF circuit 121. The baseband circuit 111 and the RF circuit 121 may be collectively configured as a one-chip integrated circuit (IC) or may be configured as separate chips.

The baseband circuit 111 includes a control circuit 112, a transmission processing circuit 113, a reception processing circuit 114, DA converters 115 and 116, and AD converters 117 and 118. The baseband circuit 111 may be a one-chip baseband LSI or baseband IC, or, as illustrated in FIG. 9, may include two chips of an IC 131 and an IC 132.

In the example in FIG. 9, the IC 131 includes the DA converters 115 and 116, and the AD converters 117 and 118. The IC 132 includes the control circuit 112, the transmission processing circuit 113 and the reception processing circuit 114. How to divide components included in respective ICs is not limited to this. Further, the baseband circuit 111 may be constituted of three or more ICs.

The control circuit 112 performs processing regarding communication with other nodes. Specifically, the control circuit 112 handles three types of MAC frames of a data frame, a control frame and a management frame, and executes various kinds of processing defined in a MAC layer.

Further, the control circuit 112 may execute processing in an upper layer of the MAC layer (such as, for example, TCP/IP and UDP/IP, and an application layer which is further upper layer of TCP/IP and UDP/IP). Each functional configuration of the above-described wireless communication unit 12 may be realized by the control circuit 112 executing a program. The program may be stored in a memory provided at the control circuit 112.

The transmission processing circuit 113 receives a MAC frame from the control circuit 112. The transmission processing circuit 113 executes addition of a preamble and a PHY header to the MAC frame and encoding and modulation of the MAC frame. By this means, the transmission processing circuit 113 converts the MAC frame into a PHY packet.

The DA converters 115 and 116 digital-to-analog-convert the PHY packet output from the transmission processing circuit 113. While, in the example of FIG. 9, two systems of DA converters are provided and perform parallel processing, it is also possible to employ a configuration where one DA converter is provided or DA converters corresponding to the number of antennas are provided.

The RF circuit 121 is, for example, a one-chip RF analog IC or high-frequency IC. The RF circuit 121 may be collectively constituted of the baseband circuit 111 as one chip or may be constituted of two chips of an IC including a transmission circuit 122 and an IC including a reception processing circuit. The RF circuit 121 includes the transmission circuit 122 and a reception circuit 123.

The transmission circuit 122 performs analog signal processing on the PHY packet which is DA converted by the DA converters 115 and 116. An analog signal output from the transmission circuit 122 is wirelessly transmitted via an antenna. The transmission circuit 122 includes, a transmission filter, a mixer, a power amplifier (PA), or the like.

The transmission filter extracts a signal of a desired band from a signal of the PHY packet which is digital-to-analog-converted by the DA converters 115 and 116. The mixer up-converts the signal filtered by the transmission filter into a wireless frequency by utilizing a signal of a fixed frequency supplied from an oscillator. A pre-amplifier amplifies the up-converted signal. The amplified signal is supplied to the antenna, and a wireless signal is transmitted.

The reception circuit 123 performs analog signal processing on the signal received at the antenna. The signal output from the reception circuit 123 is input to the AD converters 117 and 118. The reception circuit 123 includes an LNA (Low Noise Amplifier), a mixer, a reception filter, or the like.

The LNA amplifies the signal received at the antenna. The mixer down-converts the amplified signal into a baseband by utilizing a signal of a fixed frequency supplied from the oscillator. The reception filter extracts a signal of a desired band from the down-converted signal. The extracted signal is input to the AD converters 117 and 118.

The AD converters 117 and 118 analog-to-digital-convert the input signal from the reception circuit 123. While, in the example of FIG. 9, two systems of AD converters are provided and perform parallel processing, it is also possible to employ a configuration where one AD converter is provided or AD converters corresponding to the number of antennas are provided.

The reception processing circuit 114 receives the PHY packet which is analog-to-digital-converted by the AD converters 117 and 118. The reception processing circuit 114 performs demodulation and decoding of the PHY packet, removal of the preamble and the PHY header from the PHY packet, or the like. By this means, the reception processing circuit 114 converts the PHY packet into a MAC frame. The frame subjected to the processing by the reception processing circuit 114 is input to the control circuit 112.

It should be noted that, while, in the example of FIG. 9, the DA converters 115 and 116 and the AD converters 117 and 118 are disposed in the baseband circuit 111, it is also possible to employ a configuration where the DA converters 115 and 116 and the AD converters 117 and 118 are disposed in an RF unit 121.

Figure 10:
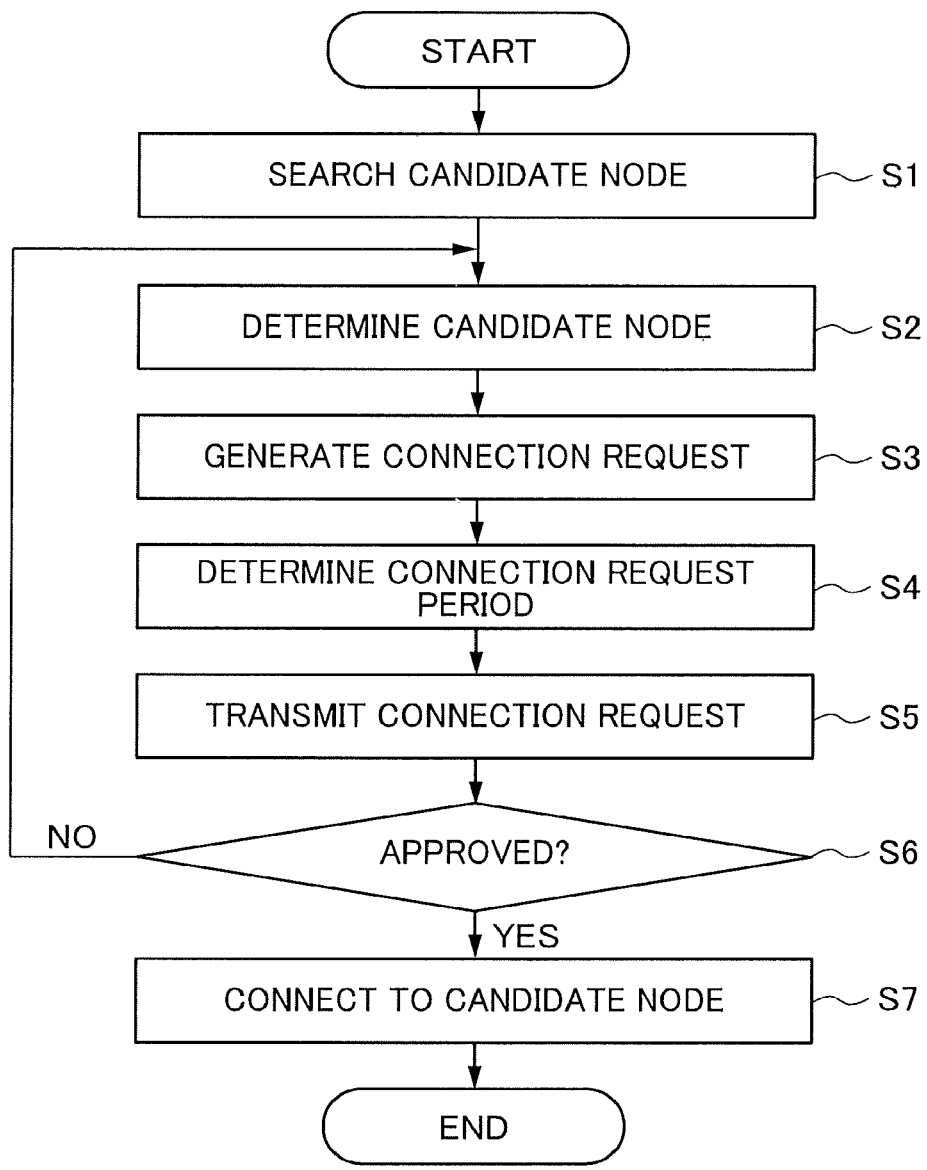
FIG. 10 is a flowchart illustrating an example of connection request processing of the wireless communication device.

Operation of the wireless communication device 1 according to the present embodiment will be described next with reference to FIG. 10 and FIG. 11. FIG. 10 is a flowchart illustrating an example of the connection request processing of the wireless communication device 1. The wireless communication device 1 executes the connection request processing upon power activation or when it is determined that the connected parent node is inappropriate. It should be noted that, in the following description, it is assumed that the frame information and the node ID of the own node are stored in the wireless communication device 1 in advance.

When the connection request processing is started, first, the transceiver 13 searches for a candidate node which becomes a candidate of the parent node (step S1). Specifically, the transceiver 13 executes reception processing during a candidate node search period. While the candidate node search period is, for example, one frame, the candidate node search period is not limited to this.

When the transceiver 13 receives a wireless signal during the candidate node search period, the transceiver 13 acquires reception information included in the wireless signal and stores the acquired reception information. Specifically, the transceiver 13 stores the node ID of the transmission source node, the rank value of the transmission source node, and signal strength of the wireless signal for each wireless signal. While the signal strength is an RSSI (Received Signal Strength Indicator), the signal strength is not limited to this.

When the candidate node search period is finished, the transceiver 13 passes the stored information to the transmission destination node determiner 17. The transmission destination node determiner 17 then determines a candidate node based on the received information (step S2).

The transmission destination node determiner 17, for example, determines a node for which signal strength of the wireless signal is the largest as the candidate node. Further, when the own node is connected, the transmission destination node determiner 17 may determine a node for which signal strength of the wireless signal is the largest among nodes having rank values smaller than the rank value of the own node by one or greater as the candidate node.

The transmission destination node determiner 17 determines a rank value greater than the rank value of the determined candidate node by one as the rank value of the own node.

The transmission destination node determiner 17 then instructs the transmission information generator 16 to generate a connection request. The transmission information generator 16 generates a connection request including the rank value and the node ID of the own node and the node ID of the transmission destination node (candidate node) (step S3).

Further, the timing determiner 18 acquires the connection accepting period of the candidate node based on the rank value and the node ID of the candidate node and the frame information, and determines at least part of the acquired connection accepting period as the connection request period (step S4). For example, when the wireless node X in FIG. 7 is the candidate node, the timing determiner 18 determines the slot 5 of the slot group 6 as the connection request period.

When the timing determiner 18 starts the determined connection request period, the transceiver 13 receives the connection request from the transmission information generator 16, converts the connection request into a wireless signal and transmits the wireless signal (step S5). The transceiver 13 may continuously transmit the connection request or transmit the connection request a predetermined number of times during the connection request period.

Subsequently, when the transceiver 13 receives a wireless signal indicating approval of connection from the candidate node during the connection request period (step S6: Yes), the wireless communication device 1 is connected to the wireless communication system as a child node of the candidate node (step S7).

On the other hand, when the transceiver 13 does not receive a wireless signal indicating approval of connection from the candidate node during the connection request period (step S6: No), the processing returns to step S2, and the transmission destination node determiner 17 determines a new candidate node. At this time, the processing may return to step S1, and the wireless communication device 1 may search for the candidate node again.

Figure 11:
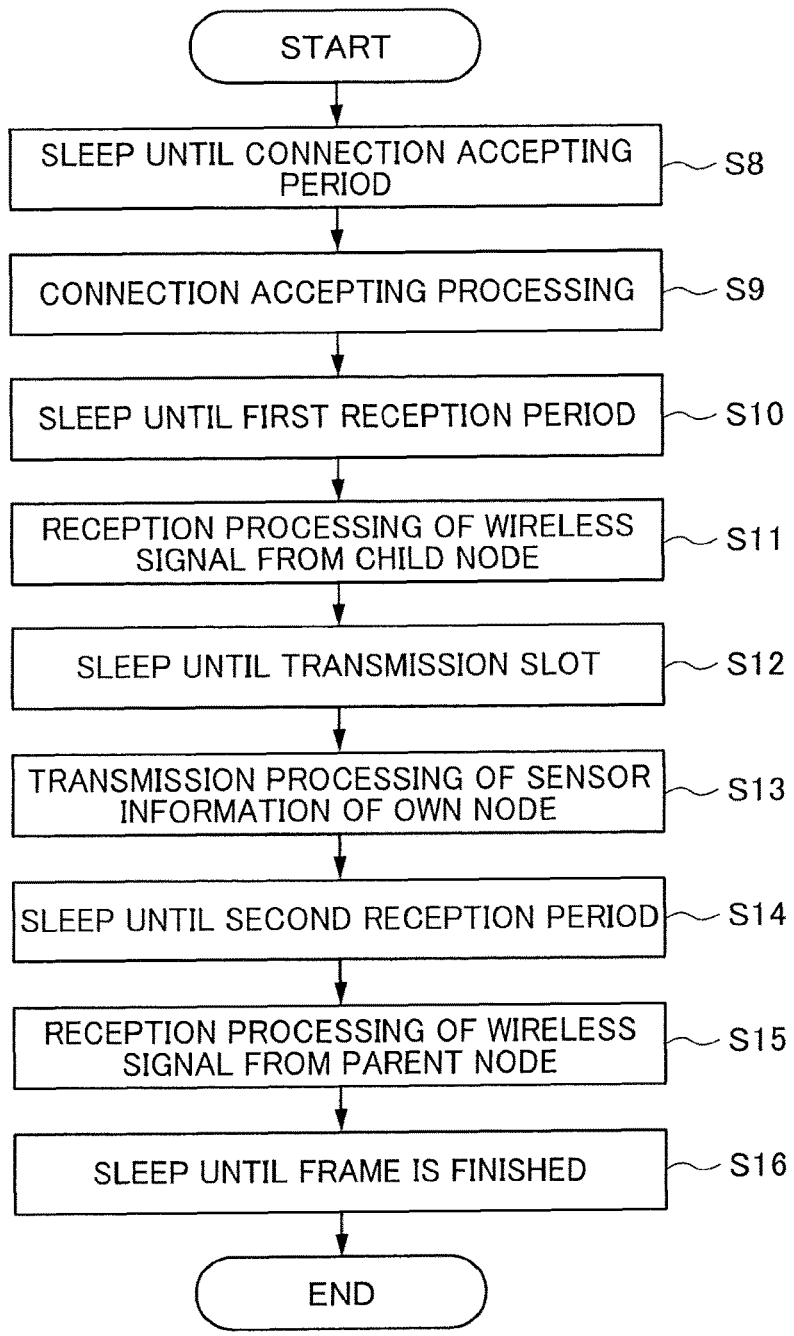
FIG. 11 is a flowchart illustrating an example of normal operation corresponding to one frame of the connected wireless communication device.

FIG. 11 is a flowchart illustrating an example of normal operation corresponding to one frame of the connected wireless communication device 1. In the following description, it is assumed that the wireless communication device 1 is a wireless node X having the rank value R and is connected to the child node Y and the parent node Z. Further, it is assumed that the connection accepting period of the wireless node X is a slot X of the slot group (R+2).

As illustrated in FIG. 11, the wireless node X sleeps until the connection accepting period is started (step S8).

When the connection accepting period (slot X of the slot group (R+2)) is started, the sleep controller 20 wakes up the wireless node X. The waked up wireless node X executes connection accepting processing during the connection accepting period (step S9). Specifically, the transceiver 13 receives a wireless signal and acquires reception information, and the destination determiner 14 determines whether the wireless signal is a connection request addressed to the own node. When the wireless signal is a connection request addressed to the own node, the transceiver 13 judges whether or not connection is possible and returns a signal according to the judgment result to a new wireless node of a transmission source of the connection request. The signal to be returned can be generated by the transmission information generator 16.

Subsequently, when the connection accepting period is finished, the transceiver 13 finishes the connection accepting processing, and the sleep controller 20 puts the wireless node X into a sleep state. The wireless node X sleeps until the first reception period is started (step S10).

When the first reception period is started, the sleep controller 20 wakes up the wireless node X. The first reception period is, for example, a slot group (R+1) or a slot Y of the slot group (R+1). The waked up wireless node X executes reception processing of the wireless signal from the child node Y during the first reception period (step S11).

Specifically, the transceiver 13 receives a wireless signal and acquires sensor information included in the wireless signal through signal processing. The destination determiner 14 then determines whether the acquired sensor information is addressed to the own node. When the sensor information is addressed to the own node, the relay information storage 15 stores the sensor information. The transmission information generator 16 then generates transmission information including the sensor information stored in the relay information storage 15, the sensor information of the own node, the node ID and the rank value of the own node, the node ID of the transmission destination node, or the like.

Subsequently, when the first reception period is finished, the wireless node X finishes reception processing of the wireless signal from the child node Y, and the sleep controller 20 puts the wireless node X into a sleep state. The wireless node X sleeps until a transmission slot is started (step S12).

When the transmission slot (slot X of the slot group R) is started, the sleep controller 20 wakes up the wireless node X. The waked up wireless node X executes transmission processing of the sensor information of the own node during the transmission slot (step S13). Specifically, the transceiver 13 transmits the transmission information generated by the transmission information generator 16. This transmission information includes the sensor information received from the child node Y as described above. Therefore, by the transmission information being transmitted, the sensor information received from the child node Y is transmitted (relayed) along with the sensor information of the own node. The transceiver 13 may continuously transmit the transmission information or transmit the transmission information a predetermined number of times during the transmission slot.

Subsequently, when the transmission slot is finished, the wireless node X finishes the transmission processing of the sensor information of the own node, and the sleep controller 20 puts the wireless node X into a sleep state. The wireless node X sleeps until the second reception period is started (step S14).

When the second reception period is started, the sleep controller 20 wakes up the wireless node X. The second reception period is, for example, a slot group (R−1) or a slot Z of the slot group (R−1). The waked up wireless node X executes reception processing of the wireless signal from the parent node Z during the second reception period (step S14). Specifically, the transceiver 13 receives the wireless signal and acquires reception information. The transceiver 13 then judges whether or not the parent node Z is appropriate based on signal strength of the wireless signal and the reception information. For example, when the signal strength of the wireless signal from the parent node Z is equal to or less than a predetermined value, the transceiver 13 judges that the parent node Z is inappropriate. In this case, the wireless node X can determine a new parent node through the connection request processing in FIG. 10 and connect to the new parent node. Further, when the second reception period is the slot group (R−1), the wireless node X may determine a new parent node based on the wireless signal received during the second reception period. For example, the wireless node X can determine a wireless node for which signal strength of the received wireless signal is the largest as the new parent node. By this means, it is possible to determine a new parent node among wireless nodes having the rank value (R−1).

Subsequently, when the second reception period is finished, the wireless node X finishes the reception processing of the wireless signal from the parent node Z, and the sleep controller 20 puts the wireless node X into a sleep state. The wireless node X sleeps until the frame is finished (step S16).

Thereafter, the wireless node X remains to sleep until a connection accepting period of the next frame is started (step S8).

As described above, the wireless communication device according to the present embodiment determines a slot to which the own node is assigned in the slot group having the rank value of the own node as the transmission slot. By this means, it is possible to automatically construct a wireless communication system whose information communication period is within one frame.

Further, the wireless communication device according to the present embodiment determines a slot to which the own node is assigned in the slot group to which a rank value different from the rank value of the own node is assigned as the connection accepting period. By this means, the wireless communication device can suppress collision between the connection request and other wireless signals to the own node and improve reception accuracy of the connection request.

Further, the wireless communication device according to the present embodiment can also determine a slot to which the own node is assigned in the slot group to which a rank value greater than the rank value of the own node by two or greater as the connection accepting period. It is possible to start relay of the sensor information of the new wireless node quickly.

It should be noted that the present invention is not limited to the above-described embodiments as is and can be embodied by modifying components without departing from the gist when the present invention is implemented. Further, various inventions can be realized by combining a plurality of components disclosed in the above-described embodiments as appropriate. Further, for example, a configuration is also possible where some components are deleted from all the components described in the embodiments. Still further, it is also possible to combine the components described in different embodiments as appropriate.

The invention claimed is:

1. A wireless communication device, which is one of a plurality of wireless communication devices in a multihop wireless communication system to transmit and receive information with each other, comprising:
   a transceiver configured to transmit information in an m-th slot (in is an integer equal to or more than 1 and equal to or less than M, M is an integer equal to or more than 2) in a first slot group in N slot groups (N is an integer equal to or more than 2) in a frame, respective one of the slot groups including M slots, and
   a control circuit configured to control the transceiver to receive a connection request in an m-th slot in a second slot group in the N slot groups from a wireless communication device which is in the multihop wireless communication system but which has not been connected to the wireless communication device, the second slot group being different from the first slot group.

2. The wireless communication device according to claim 1, wherein as the number of hops of the plurality of wireless communication devices is larger, the first slot group is earlier in the frame.

3. The wireless communication device according to claim 2, wherein the second slot group is the slot group which is earlier than the first slot group by two or more.

4. The wireless communication device according to claim 2, wherein the second slot group is the slot group which is the earliest in the frame.

5. The wireless communication device according to claim 1, wherein the control circuit determines a period to accept the connection request from a wireless communication device which is in the multihop wireless communication system but which has not been connected to the wireless communication device, as a period to transmit the connection request to a wireless communication device which is in the multihop wireless communication system but which has not been connected to the wireless communication device.

6. The wireless communication device according to claim 1, wherein the control circuit determines a period including the slot which is included in the slot group earlier than the slot group to which the own node is assigned and to which a second wireless communication device is assigned, as a first reception period during which the information from the second wireless communication device is received.

7. The wireless communication device according to claim 1, wherein the control circuit determines a period including the slot which is included in the slot group later than the slot group to which the own node is assigned and to which a second wireless communication device is assigned, as a second reception period during which the information from the second wireless communication device is received.

8. The wireless communication device according to claim 1, further comprising a sleep control circuit configured to pause transmission processing of the information by the transceiver.

9. A multihop wireless communication system including a plurality of wireless communication devices, comprising: first group wireless communication devices included in the plurality of wireless communication devices and the first group wireless communication devices having a same number of hops,
respective one of the first group wireless communication devices configured to;
by a transmission circuit, transmit information to one of the plurality of wireless communication devices in an m-th slot (m is an integer equal to or more than 1 and equal to or less than M, M is an integer equal to or more than 2) in a first slot group in N slot groups (N is an integer equal to or more than 2) in a frame, respective one of the slot groups including M slots, and
by a reception circuit, receive a connection request in an m-th slot in a second slot group in the N slot groups from a wireless communication device which is in the multihop wireless communication system but which has not been connected to the wireless communication device, the second slot group being different from the first slot group.

10. The wireless communication system according to claim 9, wherein the wireless communication system includes the wireless communication device included in the plurality of the wireless communication device and not included in the first group wireless communication devices, and
the connection request is transmitted to at least one of the first group wireless communication devices in the m-th slot in the second slot group.

* * * * *